(12) United States Patent
Mutschler et al.

(10) Patent No.: US 8,882,623 B2
(45) Date of Patent: Nov. 11, 2014

(54) DRIVE SYSTEM AND METHOD FOR CHANGING DRIVING RANGES OF THE DRIVE SYSTEM

(75) Inventors: Steffen Mutschler, Arco (IT); Andreas Nicola, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 13/381,850

(22) PCT Filed: Jun. 15, 2010

(86) PCT No.: PCT/EP2010/003571
§ 371 (c)(1),
(2), (4) Date: Mar. 23, 2012

(87) PCT Pub. No.: WO2011/000472
PCT Pub. Date: Jan. 6, 2011

(65) Prior Publication Data
US 2012/0174704 A1 Jul. 12, 2012

(30) Foreign Application Priority Data
Jul. 1, 2009 (DE) .......................... 10 2009 031 382

(51) Int. Cl.
*F16H 47/04* (2006.01)
*F16H 61/431* (2010.01)
*F16H 61/462* (2010.01)
*F16H 3/00* (2006.01)
*F16H 37/08* (2006.01)

(52) U.S. Cl.
CPC ............ *F16H 61/431* (2013.01); *F16H 61/462* (2013.01); *F16H 47/04* (2013.01); *F16H 3/006* (2013.01); *F16H 2037/0886* (2013.01)
USPC ........................................... 475/72

(58) Field of Classification Search
USPC ......................................... 475/1, 72, 80, 218
See application file for complete search history.

(56) References Cited

U.S. PATENT DOCUMENTS 3,714,845 A    2/1973   Mooney, Jr.
5,667,452 A * 9/1997   Coutant ......................... 475/81

(Continued)

FOREIGN PATENT DOCUMENTS

| DE | 196 22 711 A1 | 12/1996 |
| DE | 199 54 894 A1 | 12/2000 |
| DE | 102 48 400 A1 | 4/2004 |
| EP | 1 626 206 A2 | 2/2006 |

OTHER PUBLICATIONS

International Search Report corresponding to PCT Application No. PCT/EP2010/003571, mailed Sep. 21, 2010 (German and English language document) (4 pages).

*Primary Examiner* — Edwin A Young
(74) *Attorney, Agent, or Firm* — Maginot, Moore & Beck LLP

(57) ABSTRACT

A drive system includes a first power branch and a second power branch. The first power branch includes a continuously variable transmission unit. The first power branch and the second power branch are connected by means of a summation gear. The summation gear includes a first, a second, and a third gear element. An output shaft of the continuously variable transmission unit is rotationally fixed to the first gear element. The second drive element can be connected to the output shaft of the first power branch. The third gear element is rotationally fixed to a mechanical transmission branch of the second power branch.

20 Claims, 2 Drawing Sheets

(56) References Cited

U.S. PATENT DOCUMENTS

| | | | |
|---|---|---|---|
| 7,901,314 B2* | 3/2011 | Salvaire et al. | 475/72 |
| 2002/0119856 A1* | 8/2002 | Pollman et al. | 475/72 |
| 2006/0276291 A1* | 12/2006 | Fabry et al. | 475/72 |

* cited by examiner

DRIVE SYSTEM AND METHOD FOR CHANGING DRIVING RANGES OF THE DRIVE SYSTEM

This application is a 35 U.S.C. §371 National Stage Application of PCT/EP2010/003571, filed Jun. 15, 2010, which claims the benefit of priority to Serial No. DE 10 2009 031 382.6, filed Jul. 1, 2009 in Germany, the disclosures of which are incorporated herein by reference in their entirety.

The disclosure relates to a drive system having a first and a second power branch which are connected to one another via a summing transmission, the first power branch having an infinitely adjustable transmission unit, and to a method for changing driving ranges of the drive system.

U.S. Pat. No. 3,714,845 has disclosed a drive system having a first and a second power branch. The first power branch has an infinitely adjustable transmission unit. Said infinitely adjustable transmission unit is connected to the second, mechanical power branch via a summing transmission. The summing transmission consists of a first and a second planetary gear mechanism. The output of the infinitely adjustable transmission unit is connected permanently in a rotationally fixed manner to in each case one element of the two planetary gear mechanisms. Furthermore, the output of the infinitely adjustable transmission unit is connected to a driven shaft which for its part is connected to a second transmission element in each case of the two planetary gear mechanisms. The respective third transmission element of the two planetary gear mechanisms can be connected to a transmission input side via a first clutch or to a transmission input side via a second clutch. Two synchronous shifting points also result from the use of two planetary gear mechanisms in the summing transmission. Here, a synchronous shifting point is understood as meaning that the input and output rotational speeds of the clutch to be closed are identical at the shifting point. A clutch of this type can therefore be closed without any slip occurring. In the solution known from U.S. Pat. No. 3,714,845, synchronous shifting points of this type are present both for the first clutch and, at another driven shaft rotational speed of the drive system, for the second clutch.

It is a problem of the drive system described that two planetary gear mechanisms are already required in order to form synchronous shifting points between the total of three driving ranges. For the case where an expansion to more transmission ratios is desired, the construction of the summing transmission therefore becomes arbitrarily complex.

It is therefore the object of the present disclosure to achieve a simplification of the known construction; the structural complexity is also to be kept low for a larger number of transmission stages; and it is also the object of the present disclosure to provide a method for controlling the driving range change.

The object is achieved by the drive system according to the disclosure having at least three driving ranges with the features and by the method described herein The drive system according to the disclosure has a first power branch and a second power branch. The first power branch comprises an infinitely adjustable transmission unit. The first power branch and the second power branch are connected to one another via a summing transmission. The summing transmission has a first transmission element which is connected permanently in a rotationally fixed manner to an output shaft of the adjustable transmission unit. A second transmission element of the summing transmission can be connected in a rotationally fixed manner to the adjustable transmission unit. In addition, the summing transmission also has a third transmission element which, according to the disclosure, is connected to an output shaft of a mechanical power branch of the second power branch. The mechanical power branch has different transmission ratios which can be selected via at least two clutches, the output shaft being connected in a rotationally fixed manner to the third transmission element.

The use of a mechanical transmission branch, the output shaft of which is connected in a rotationally fixed manner to the third transmission element, together with the described connectability of the output of the infinitely adjustable transmission unit achieves a situation where, in the case of a driving range change from a first driving range which is realized purely by the infinitely adjustable transmission unit into a second, power branched driving range, there is a synchronous shifting point. The connection of the output shaft of the infinitely adjustable transmission unit both to the first transmission element and to the second transmission element results in a compulsory rotational speed for the third transmission element.

Said third transmission element is connected to the output shaft of the mechanical transmission branch. The rotational speed ratios and transmission ratios for the first and the second driving range are coordinated here in such a way that, at a shifting point, the synchronous condition is met for one of the clutches of the mechanical transmission branch for a defined transmission stage. In contrast, the change of transmission ratios in the mechanical transmission branch for changing between the second and third driving ranges takes place by opening and closing of the two clutches of the mechanical transmission branch. These changes take place, however, using an asynchronous shifting point. Here, an asynchronous shifting point means that, during the gear change, first of all slip occurs at the clutch to be closed and, after closing of said clutch, slip occurs at the clutch to be opened. Slip occurs at both clutches during a transition phase. The jump in the rotational speed ratio between the input rotational speed and the output rotational speed of the mechanical transmission branch is therefore synchronized by the opening and closing of the two clutches of the mechanical transmission branch which are coordinated with one another. An asynchronous shifting point is spoken of in this context in the following text.

In the method according to the disclosure for changing driving ranges for the above-described system, first of all therefore, for the change from a first driving range which is realized purely via the first power branch into a second, power branched driving range, first of all the connection between the output shaft of the infinitely adjustable transmission unit and the second transmission element is opened. Here, the connection is disconnected when a synchronous shifting point is reached. At the same time, the clutch which is assigned to a transmission ratio to be produced of the second driving range of the mechanical transmission branch is closed and a rotationally fixed connection is thus produced between the input side of the mechanical transmission branch and the third transmission element of the summing transmission.

In order to change from the second driving range which is then set into a third driving range, the closed clutch of the mechanical transmission branch is opened and the second clutch which is coupled to the transmission stage to be engaged of the third, likewise power branched driving range is closed. This takes place when an asynchronous shifting point is reached.

The procedure according to the disclosure has the advantage that a change can be carried out firstly between a first driving range which is realized purely by the first power branch into a power branched driving range in a manner which is free of shifting jolts and, above all, is free of interruptions to the traction force. A transition of this type between a first driving range and a second driving range frequently occurs in the use of mobile machines which are equipped with drive systems of this type. In contrast, practically as many further driving ranges as desired can be defined in power branched operation by use of the mechanical transmission branch with at least two clutches in the second power branch. As a result, the overall spread of the transmission ratio of the drive system can be increased considerably. Here, changing which is free of jolts and free of interruptions in the traction force is no longer so important in the further driving ranges. Here, the configuration of the drive system according to the disclosure facilitates the addition of further transmission stages. In particular, a more complex structural configuration of the summing transmission is not necessary even in the case of a plurality of further transmission stages. In any case, it is sufficient to configure it as a single planetary gear mechanism, that is to say as a planetary gear mechanism with only one gear set.

Advantageous developments of the drive system according to the disclosure and of the method according to the disclosure are described herein.

It is advantageous, in particular, to configure the mechanical transmission branch as a dual clutch transmission.

As has already been explained, it is particularly advantageous to configure the summing transmission as a single planetary gear mechanism with merely one gear set. It is particularly preferred here if the first transmission element is the sun gear of the planetary gear mechanism and the second transmission element is the spider of the planetary gear mechanism.

The infinitely adjustable transmission unit is preferably connected in a rotationally fixed manner to a driven shaft of the drive system via a clutch. The driven shaft for its part is connected permanently in a rotationally fixed manner to the second transmission element via a transmission stage. The required transmission ratio can be set easily via this additional transmission stage, which transmission ratio fixes the synchronous shifting point, for example, for economical reasons, for example with the overall degree of efficiency being taken into consideration. Here, at least one transmission stage could also be provided, in particular, between the output shaft of the infinitely adjustable transmission unit and the driven shaft of the drive system. The synchronous shifting point can be coordinated in a targeted manner to the transmission ratio of the mechanical transmission branch in the second driving range by these two transmission stages, via which firstly the driven shaft is connected to the second transmission element and secondly the driven shaft is connected to the output shaft of the infinitely adjustable transmission.

It is particularly preferred to use a hydrostatic transmission as infinitely adjustable transmission unit. Here, the hydrostatic transmission is configured in such a way that at least the hydraulic pump is configured as an adjustable unit. The hydraulic motor is preferably a fixed displacement motor, since fixed displacement motors have a particularly high degree of efficiency.

The mechanical power branch preferably has a first clutch and a second clutch, via which an input shaft can be connected to a first clutch shaft or can be connected to a second clutch shaft via the second clutch. Here, the disconnection takes place on the input side via the transmission shafts. The first transmission stage for the first driving direction preferably follows adjacently between the first clutch shaft and the output shaft. In contrast, the second clutch shaft is connected to the output shaft via a transmission stage for the opposite driving direction. It is preferred, however, if yet further driving stages are provided in each case between the first clutch shaft and the output shaft and between the second clutch shaft and the output shaft. In particular, at least one second transmission stage for the first driving direction can be provided between the second clutch shaft and the output shaft. In order to change between the transmission stage for the opposite driving direction and the second transmission stage for the first driving direction, the respective idler gears of the two transmission stages can be connected alternately to the second clutch shaft by means of a selector sleeve.

If, in contrast, there is also to be more than one transmission stage in the mechanical power branch for the opposite driving direction, as a rule therefore the reverse driving direction, a further transmission stage for this opposite driving direction is also provided between the first clutch shaft and the output shaft. Whereas, in the case of merely one transmission stage for driving in reverse, the first transmission stage can be connected permanently in a rotationally fixed manner to the first clutch shaft, in turn in each case one idler gear is provided for the first transmission stage and for the further transmission stage in the case of at least one further transmission stage for the opposite driving direction. Said idler gears can then in turn be connected alternately in a rotationally fixed manner to the first clutch shaft by means of a selector sleeve. It is self-evident that further transmission stages can additionally be provided for forward driving and reverse driving.

In addition, the method according to the disclosure preferably has a method step, by way of which an adaptation of the transmission ratio of the infinitely adjustable transmission unit is performed in the case of a change between the second and third driving ranges. In the case of an adjustable hydraulic pump, the pivoting angle of the hydraulic pump is set for this purpose. In particular, the transmission ratios are selected in such a way that the pump is pivoted to its second extreme value when the asynchronous shifting point is reached for changing the second into the third driving range. The pump can preferably be operated in two delivery directions. In this way, a great speed range can be realized by way of the drive system.

The drive system according to the disclosure is provided, in particular, for traction drives. In the following text, the function and the details of the drive system will be described in detail using the example of a traction drive of this type. In principle, however, the drive system with the power branch can also be used for other drives.

BRIEF DESCRIPTION OF THE DRAWINGS

One preferred exemplary embodiment is shown in the drawing and will be described in greater detail in the following description. In the drawing.

DETAILED DESCRIPTION

The drive system 1 according to the disclosure is preferably used for a traction drive. A drive motor 2 is provided on the input side. As a rule, a drive motor 2 of this type is configured as an internal combustion engine, in particular a diesel internal combustion engine. A driven shaft 23 is provided on the output side, which driven shaft 23 connects the drive system 1 according to the disclosure to, for example, a driven vehicle axle.

Figure 1:
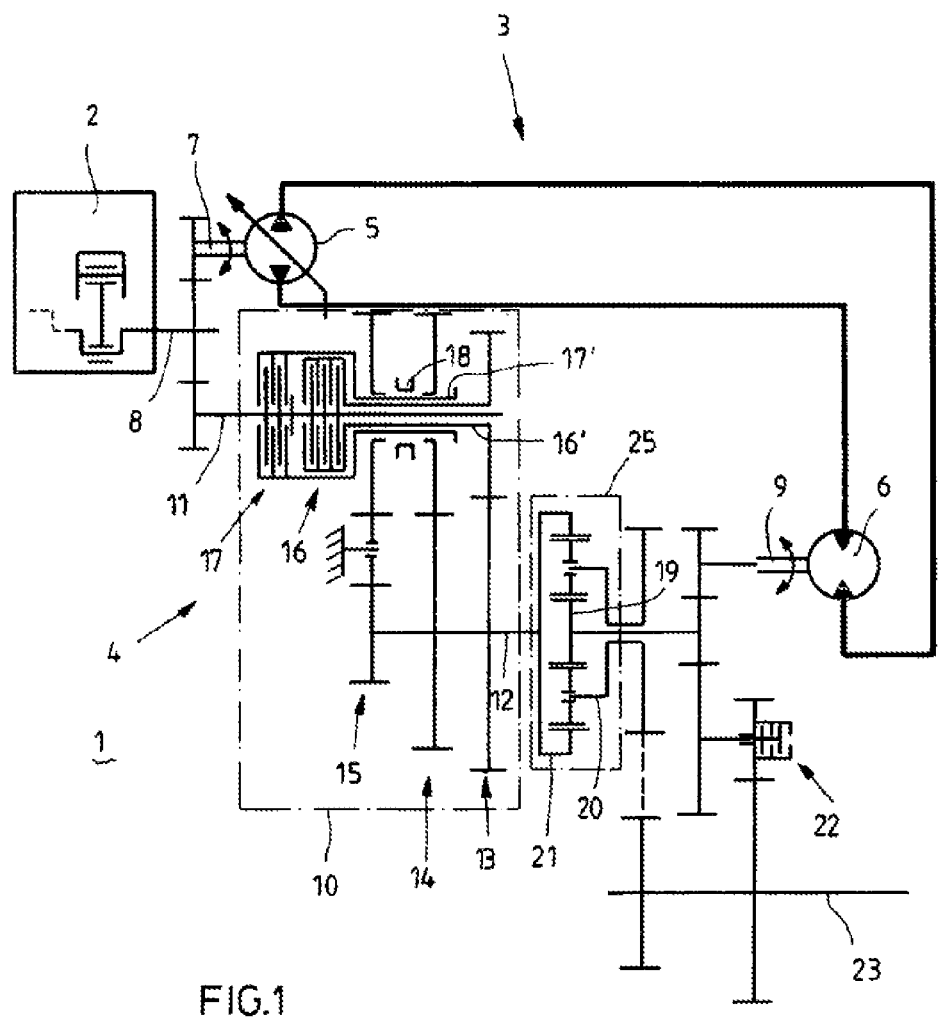
FIG. 1 shows a diagrammatic illustration of the drive system according to the disclosure.

The drive system 1 has a first power branch which is configured as an infinitely adjustable transmission unit. In the exemplary embodiment which is shown, the infinitely adjustable transmission unit is a hydrostatic transmission 3. The second power branch 4 is a mechanical power branch. The hydrostatic transmission 3 has an adjustable hydraulic pump 5 and a fixed displacement motor 6. The hydraulic pump 5 and the fixed displacement motor 6 are connected to one another in the closed circuit via two working lines. The elements which are known per se with regard to a hydrostatic transmission 3 are not shown in FIG. 1 for the sake of simplification. This relates, in particular, to the adjusting apparatus for the hydraulic pump 5.

The hydraulic pump 5 is driven via a pump shaft 7. The pump shaft 7 is connected permanently to a driven shaft 8 of the drive motor 2 via a transmission stage.

The first power branch and the second power branch are coupled to one another on the output side via a summing transmission 25. In order to feed in the output moment which is generated via the first power branch or the hydraulic motor 6 there, the output shaft 9 of the hydraulic motor 6 is connected to the summing transmission 25.

The second power branch 4 is formed by a mechanical transmission branch, a dual clutch transmission 10 in the exemplary embodiment shown. The dual clutch transmission 10 is likewise connected permanently to the drive motor 2 on the input side. To this end, the input shaft 11 of the dual clutch transmission 10 is connected to the driven shaft 8 of the drive motor 2 via a second transmission stage.

On the output side, an output shaft 12 of the dual clutch transmission 10 is connected to the summing transmission 25. The summing transmission 25 therefore has two inputs which are connected permanently to the hydraulic motor 6 on one side and are connected permanently to the output shaft 12 of the dual clutch transmission 10 on the other side. In the following text, the precise configuration of the summing transmission 25 and the connection to the driven shaft 23 of the drive system 1 will be described in detail.

In order for it to be possible for different transmission ratios for the at least two power branched driving ranges to be realized, at least one first transmission stage 13 and one second transmission stage 14 are configured in the dual clutch transmission 10. Both transmission stages 13, 14 are connected permanently to the output shaft 12 of the dual clutch transmission 10. In order to connect the transmission stage to be engaged in each case to an input shaft 11 of the dual clutch transmission 10, a first clutch 16 and a second clutch 17 are provided. The two clutches 16, 17 are connected to in each case one clutch shaft 16', 17'.

In the exemplary embodiment shown, there is also a further transmission stage 15 which is provided for driving in reverse, in addition to the two transmission stages 13, 14. In order to change between the second transmission stage 14 and the transmission stage for driving in reverse 15, a selector sleeve 18 is provided, by way of which in each case one idler gear of the transmission stage for driving in reverse 15 or of the second transmission stage 14 can be connected in a rotationally fixed manner to the second clutch shaft 17'. As a result of the arrangement of the selector sleeve 18 between the second transmission stage 14 and the transmission stage 15 for driving in reverse, a change can be made without actuation of the selector sleeve 18 between forward driving and driving in reverse in the respective first two driving ranges. In contrast, the first transmission stage 13 is connected permanently to the first clutch shaft 16'. In order to change the transmission ratio of the dual clutch transmission 10, in each case one of the clutches 16, is opened in the case of a rotationally fixed connection of the first transmission stage 13 to the first clutch shaft 16', whereas the other clutch is closed. However, both clutches 16, 17 are to be opened at the same time in the dual clutch transmission 10. A purely hydrostatic first driving range can therefore be realized.

The summing transmission 25 is configured as a single planetary gear mechanism. Here, single planetary gear mechanism means that there is merely one gear set. Said gear set contains a sun gear 19 as first transmission element, a spider 20 as second transmission element, and an internal gear 21 as third transmission element. The internal gear 21 is connected permanently in a rotationally fixed manner to the output shaft 12 of the dual clutch transmission 10. The sun gear 19 is connected permanently in a rotationally fixed manner to the output shaft 9 of the hydraulic motor 6. The spider is connected permanently in a rotationally fixed manner to the driven shaft 23 of the drive system 1.

In addition, the output shaft 9 can likewise be connected to the driven shaft 3 in a rotationally fixed manner via a clutch 22. It can be seen in the exemplary embodiment shown that the output shaft 9 of the hydraulic motor 6 acts on the sun gear 19 via a transmission stage. Furthermore, a further transmission stage is provided between the sun gear shaft and the input side of the clutch 22. The clutch 22 interacts on the output side in turn with the driven shaft 3 via a further transmission stage. The overall transmission ratio from the output shaft 9 to the driven shaft 23 in the case of a closed clutch 22 is denoted by $i_H$. The transmission ratio between the spider 20 and the driven shaft 3 is denoted by $i_{St}$.

In a first driving range which is not power branched and is realized purely by the hydrostatic transmission 3, the two clutches 16, 17 of the dual clutch transmission 10 are open. In contrast, the clutch 22 is closed. The output shaft 9 of the hydraulic motor 6 is therefore connected in a rotationally fixed manner not only via a single transmission ratio to the sun gear 19, but also via the transmission ratios $i_H$ and $i_{St}$ to the spider 20. A resulting rotational speed is therefore set at the internal gear 21 in accordance with the transmission ratio of the summing transmission 25. Said resulting rotational speed is a function of the rotational speed of the output shaft 9 and the transmission ratios. The transmission ratios, in particular the transmission ratio $i_{St}$ of the spider to the driven shaft 23 is selected in such a way that, in the case of an approximately maximum transmission ratio of the hydrostatic transmission 3, which corresponds to the maximum delivery volume which is set of the hydraulic pump 5, there is a synchronous condition for the change into the second driving range. In the case of this synchronous condition, the first clutch shaft 16' has to rotate at an identical rotational speed to the input shaft of the dual clutch transmission 10. In this state, a change from the first purely hydrostatic driving range to a power branched operation can take place. The shifting point is synchronous and the transition is produced by opening of the clutch 22 and simultaneous closure of the first clutch 16 of the dual clutch transmission 10. Here, the transmission ratio of the adjustable transmission unit remains constant. In this operating situation, the hydraulic pump 5 is close to its maximum delivery volume. The rotational speed of the sun gear 19 is also reduced by a following reduction in the delivery volume of the hydraulic pump 5 in the second driving range and therefore a reduction in the rotational speed of the output shaft 9 of the hydraulic motor 6. As a result, an acceleration of the spider 20 and therefore ultimately of the driven shaft occurs.

Here, the acceleration takes place at a constant rotational speed of the output shaft 12 of the dual clutch transmission 10.

The hydraulic pump 5 can preferably be pivoted beyond its zero position, with the result that a reversal of the rotational direction of the hydraulic motor 6 is brought about for further acceleration when the zero position is reached. Here, the hydraulic pump 5 is set further in the direction of its maximum delivery volume in the second delivery direction. If the maximum delivery quantity of the hydraulic pump 5 is reached, the asynchronous shifting point from the second driving range into the third driving range is then reached. During this change, furthermore, the clutch 22 remains open, and the first clutch 16 of the dual clutch transmission 10 is opened and at the same time the second clutch 17 of the dual clutch transmission 10 is closed. During the change between the first clutch 16 and the second clutch 17, the rotational speed of the output shaft 12 has to be adapted in accordance with the different transmission ratios of the first transmission stage 13 and the second transmission stage 14. To this end, at the same time the hydraulic pump 5 is pivoted completely again and is set to the maximum delivery quantity in the opposite direction. The rotational speed differences to be compensated for at the clutches 16, 17 during the change are therefore minimized. Nevertheless, slip occurs first of all at the asynchronous shifting point at the clutch to be closed, and at the clutch to be opened toward the end of the shifting operation. There is therefore preferably a time window, in which both clutches 16, 17 are slightly open and slip can occur. Said time window is used to pivot the hydraulic pump 5. In the third driving range, an acceleration of the output shaft 23 is then possible again, by the hydraulic pump 5 first of all being adjusted in the direction of a decreasing delivery volume and then further in the direction of a maximum, opposed volumetric flow. A diagrammatic illustration of the shifting change and the rotational speeds of the hydraulic motor 6 plotted against the driven shaft rotational speed is shown again in simplified form in FIG. 2.

In order to change the driving ranges in the opposite direction, the described sequences are run through accordingly in the reverse order.

It is also to be noted that the driving range change between the first purely hydrostatic driving range and the second driving range can also take place synchronously with the transmission stage 15 for driving in reverse. Here, the transmission ratio for driving in reverse and forward driving is preferably identical. The first driving ranges for forward driving ($V_I$) and driving in reverse ($R_I$) and the second driving ranges for forward driving ($V_{II}$) and driving in reverse ($R_{II}$) then correspond completely to one another. Here, the selector sleeve 18 not connected by way of the second transmission stage 14 for the third driving range, but rather by way of the transmission stage 15 for driving in reverse to the second clutch shaft 17' fixedly in terms of rotation. The rotational direction of the hydraulic motor 6 is reversed as a result. It goes without saying here that no limitation is required to merely a first and a second driving range in the reverse direction. Rather, in the same way as has already previously been described for forward driving, an extension of the spread of the transmission ratio of the entire drive system is possible as a result of the addition of further driving ranges for driving in reverse by means of the dual clutch transmission 10.

Figure 2:
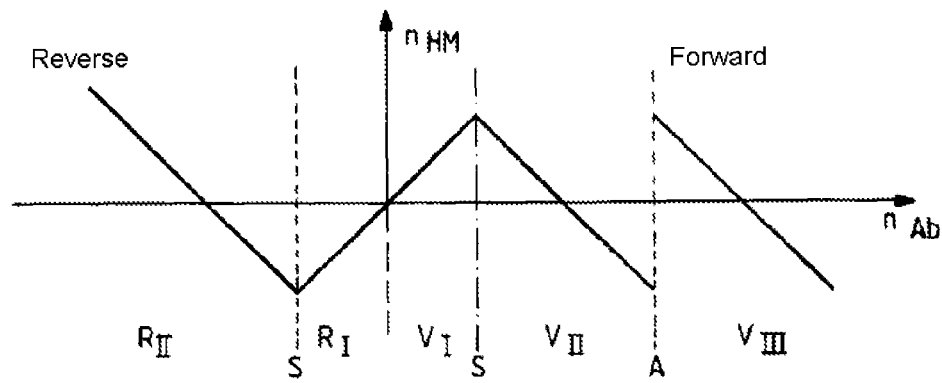
FIG. 2 shows a diagram to explain the output rotational speeds of the adjustable transmission unit and the drive system in the individual driving ranges.

FIG. 2 shows the profile of the hydraulic motor rotational speeds $n_{HM}$ which result from the set delivery volume of the pump 5 plotted against the rotational speed $n_{ab}$ of the driven shaft 23. It can be seen that no jump in the hydraulic motor rotational speed $n_{HM}$ occurs during the transition of the first driving range in the forward direction $V_I$ to the second driving range in the forward direction $V_{II}$. In contrast, a jump in the rotational speed of the hydraulic motor $N_{HM}$ can be seen at the asynchronous shifting point during the transition of the driving ranges $V_{II}$ to $V_{III}$. This is achieved by rapid complete pivoting of the hydraulic pump 5. The synchronous shifting point is also shown for the driving in reverse in a corresponding way. During reversing, that is to say therefore the change between forward driving and driving in reverse in the first driving range $R_I/V_I$, in contrast, no shifting at all is required. In this purely hydrostatic first driving range, both the driving speed and the driving direction are defined solely via the adjustment of the delivery quantity and delivery direction of the hydraulic pump 5.

Figure 3:
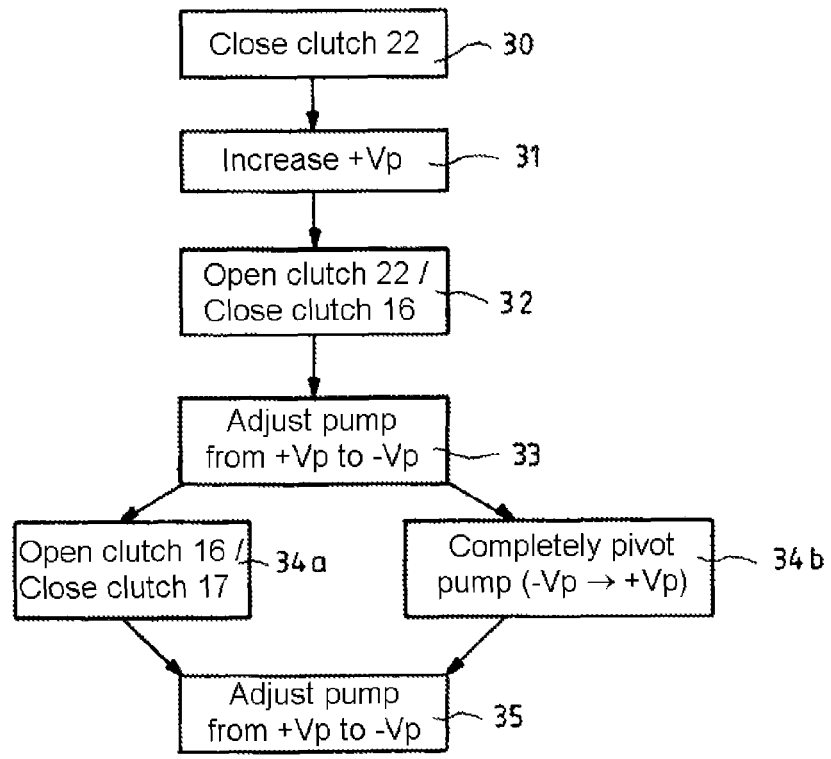
FIG. 3 shows a simplified illustration of the sequence in the case of an acceleration operation with two driving range changes.

A simplified illustration of the method according to the disclosure can be seen once again in FIG. 3. First of all, the clutch 22 is closed in step 30. Whereas the clutches 16, 17 of the dual clutch transmission 10 are open, forward driving and driving in reverse ($V_I/R_I$) are then possible purely hydrostatically in the first driving range. Acceleration in the forward direction will be described below. It goes without saying that this can also take place analogously for the reverse direction.

In order to increase the rotational speed $n_{ab}$ of the driven shaft 23, the delivery quantity of the hydraulic pump 5 is adjusted in the direction of its maximum delivery volume $+V_P$ in the first delivery direction (step 31). When the maximum delivery quantity $+V_P$ of the hydraulic pump 5 is reached, the clutch 22 is then opened for the driving range change into the second driving range $V_{II}$ and therefore the connection between the output shaft 9 and the driven shaft 23 is interrupted. At the same time, the first clutch 16 of the dual clutch transmission 10 is closed and thus a connection of the input shaft 11 to the output shaft 12 of the dual clutch transmission 10 is produced via the first transmission stage 13 (step 32). In the case of this driving range change, an adjustment of the delivery quantity of the hydraulic pump 5 is not required on account of the synchronous shifting point. This can also be seen in the profile of the rotational speed $n_{HM}$ in FIG. 2. For further acceleration, subsequently the hydraulic pump 5 is adjusted (step 33) from its maximum delivery volume in the first direction $+V_P$ in the direction of its maximum delivery volume in the opposite delivery direction $-V_P$. When the maximum delivery volume ($-V_P$) in the opposite second direction is reached, the asynchronous shifting point of the driving range change from $V_{II}$ to $V_{III}$ is also reached.

Here, the first clutch 16 is opened and the second clutch 17 of the dual clutch transmission 10 is closed (step 34a). A switchover is therefore carried out to the second transmission stage 14 of the dual clutch transmission 10, the selector sleeve 18 to this end connecting the second transmission stage 14 in a rotationally fixed manner to the second clutch shaft. It would theoretically be conceivable that a further acceleration is carried out by this changing process during opening and closing of the clutches 16, 17 without adjustment of the rotational speed of the hydraulic motor 6. However, this would lead to slipping of the clutch 17 until the maximum driving speed is reached. In order to prevent this, the pump 5 is instead rapidly pivoted completely, that is to say is adjusted in as short a time as possible from $-V_P$ to $+V_P$ (step 34b). The complete pivoting of the hydraulic pump 5 and the opening and closing of the clutches 16 and 17 take place at the same time in method steps 34a and 34b. For further acceleration, subsequently the pump 5 which is at its maximum delivery volume in the first delivery direction after termination of the shifting operation from the driving range 2 into the driving range 3 is adjusted again from $+V_P$ to $-V_P$.

The above comments relate in each case to an acceleration from a standstill in the forward direction across all three driving ranges. It can be seen readily that the driving ranges can also be changed in an analogous way during driving in reverse and that the steps have to be carried out in the reverse order in order to change the driving ranges from III to II and from II to I.

The disclosure is not restricted to the exemplary embodiment shown. Rather, individual elements and features of the present disclosure can also advantageously be combined with one another. In particular, the dual clutch transmission can also have more or fewer transmission stages.

The invention claimed is:

1. A drive system comprising:
a first power branch which has an infinitely adjustable transmission unit; and
a second power branch,
wherein the first power branch and the second power branch are connected to a summing transmission which has (i) a first transmission element connected in a rotationally fixed manner to an output shaft of the adjustable transmission unit, (ii) a second transmission element configured to be connected in a rotationally fixed manner to the adjustable transmission unit, and (iii) a third transmission element,
wherein the second power branch is a mechanical transmission branch including a first transmission stage for a first driving direction having a first fixed transmission ratio, and a second transmission stage for the first driving direction having a different second fixed transmission ratio,
wherein the first and second transmission stages are configured to be selected via clutches, and
wherein an output shaft of the second power branch is connected in a rotationally fixed manner to the third transmission element.

2. The drive system as claimed in claim 1, wherein the second power branch comprises a dual clutch transmission.

3. The drive system as claimed in claim 1, wherein the summing transmission is a single stage planetary gear mechanism.

4. The drive system as claimed in claim 1, wherein:
the adjustable transmission unit is configured to connect in a rotationally fixed manner to a driven shaft of the drive system via a clutch, and
the driven shaft is connected permanently in a rotationally fixed manner to the second transmission element via a gear stage.

5. The drive system as claimed in claim 1, wherein the adjustable transmission unit is a hydrostatic transmission.

6. The drive system as claimed in claim 1, wherein:
an input shaft is configured to connect to a first clutch shaft by a first clutch and
the input shaft is configured to connect to a second clutch shaft by a second clutch.

7. The drive system as claimed in claim 6, wherein:
the first transmission stage for the first driving direction is arranged between the first clutch shaft and the output shaft of the second power branch, and
a transmission stage for an opposite second driving direction is arranged between the second clutch shaft and the output shaft of the second power branch.

8. A drive system comprising:
a first power branch which has an infinitely adjustable transmission unit; and
a second power branch,
wherein the first power branch and the second power branch are connected to a summing transmission which has (i) a first transmission element which is connected in a rotationally fixed manner to an output shaft of the adjustable transmission unit, (ii) a second transmission element which can be connected in a rotationally fixed manner to the adjustable transmission unit, and (iii) a third transmission element,
wherein the second power branch is a mechanical transmission branch with different fixed transmission ratios which can be selected via clutches,
wherein an output shaft of the second power branch is connected in a rotationally fixed manner to the third transmission element,
wherein the summing transmission is a single stage planetary gear mechanism, and
wherein the first transmission element is a sun gear of the planetary gear mechanism and the second transmission element is a spider of the planetary gear mechanism.

9. The drive system as claimed in claim 8, wherein the second power branch comprises a dual clutch transmission.

10. The drive system as claimed in claim 8, wherein:
the adjustable transmission unit is configured to connect in a rotationally fixed manner to a driven shaft of the drive system via a clutch, and
the driven shaft is connected permanently in a rotationally fixed manner to the second transmission element via a gear stage.

11. A drive system comprising:
a first power branch which has an infinitely adjustable transmission unit; and
a second power branch,
wherein the first power branch and the second power branch are connected to a summing transmission which has (i) a first transmission element which is connected in a rotationally fixed manner to an output shaft of the adjustable transmission unit, (ii) a second transmission element which can be connected in a rotationally fixed manner to the adjustable transmission unit, and (iii) a third transmission element,
wherein the second power branch is a mechanical transmission branch with different fixed transmission ratios which can be selected via clutches,
wherein an output shaft of the second power branch is connected in a rotationally fixed manner to the third transmission element,
wherein an input shaft can be connected to a first clutch shaft by a first clutch and
wherein the input shaft can be connected to a second clutch shaft by a second clutch
a first transmission stage for a first driving direction is arranged between the first clutch shaft and the output shaft of the second power branch,
a transmission stage for an opposite second driving direction is arranged between the second clutch shaft and the output shaft of the second power branch, and
wherein at least one second transmission stage for the first driving direction is provided between the second clutch shaft and the output shaft of the second power branch.

12. The drive system as claimed in claim 11, further comprising an idler gear configured to connect in a rotationally fixed manner to the second clutch shaft via a selector sleeve for changing between the transmission stage for the opposite second driving direction and the second transmission stage of the first driving direction.

13. The drive system as claimed in claim 11, further comprising a further transmission stage for the opposite second driving direction, wherein the further transmission stage is arranged between the first clutch shaft and the output shaft of the second power branch.

14. The drive system as claimed in claim 13, further comprising an idler gear configured to connect in a rotationally fixed manner to the first clutch shaft via a selector sleeve for changing between the first transmission stage and the further transmission stage for the opposite second driving direction.

15. The drive system as claimed in claim 11, wherein the second power branch comprises a dual clutch transmission.

16. The drive system as claimed in claim 11, wherein the summing transmission is a single stage planetary gear mechanism.

17. The drive system as claimed in claim 11, wherein:
the adjustable transmission unit is configured to connect in a rotationally fixed manner to a driven shaft of the drive system via a clutch, and
the driven shaft is connected permanently in a rotationally fixed manner to the second transmission element via a gear stage.

18. A method for changing driving ranges of a drive system including a first power branch which has an infinitely adjustable transmission unit and a second power branch, the first power branch and the second power branch being connected to a summing transmission which has (i) a first transmission element which is connected in a rotationally fixed manner to an output shaft of the adjustable transmission unit, (ii) a second transmission element configured to connect in a rotationally fixed manner to the adjustable transmission unit, and (iii) a third transmission element, the second power branch being a mechanical transmission branch with different transmission ratios configured to be selected via clutches, and an output shaft of the second power branch being connected in a rotationally fixed manner to the third transmission element, the method comprising:
increasing a transmission ratio of the adjustable transmission unit in a first driving range in the case of a produced connection of the output shaft of the adjustable transmission unit to the second transmission element until a rotational speed ratio of the output shaft of the mechanical transmission branch to an input shaft of the mechanical transmission branch is reached, which rotational speed ratio corresponds to the transmission ratio of the mechanical transmission branch in a second driving range to be set;
disconnecting of a connection of the output shaft of the adjustable transmission unit to the second transmission element and connecting the input shaft of the mechanical transmission branch to the output shaft of the mechanical transmission branch via a first transmission stage to the third transmission element, which transmission stage defines the second driving range to be set; and
disconnecting of the connection of the output shaft of the mechanical transmission branch to the input shaft of the mechanical transmission branch via the first transmission stage and connecting of the output shaft of the mechanical transmission branch to the input shaft of the mechanical transmission branch via a second transmission stage which defines a third driving range, for changing from the second into the third driving range.

19. The method as claimed in claim 18, wherein, during the disconnecting of the connection of the output shaft of the mechanical transmission branch to the input shaft of the mechanical transmission branch via the first transmission stage and the connecting of the output shaft of the mechanical transmission branch to the input shaft of the mechanical transmission branch via the second transmission stage which defines the third driving range, a rotational speed adaptation of the first transmission element is carried out by setting the transmission ratio of the adjustable transmission unit.

20. The method as claimed in claim 19, wherein a delivery volume of a hydraulic pump of a hydrostatic transmission which forms the adjustable transmission unit is set in order to set the transmission ratio.

* * * * *